US007046631B1

(12) United States Patent
Giroux et al.

(10) Patent No.: US 7,046,631 B1
(45) Date of Patent: May 16, 2006

(54) METHOD AND APPARATUS FOR PROVISIONING TRAFFIC DEDICATED CORES IN A CONNECTION ORIENTED NETWORK

(75) Inventors: Natalie Giroux, Ottawa (CA); Michael Gassewitz, Dunrobin (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/235,387

(22) Filed: Jan. 22, 1999

(51) Int. Cl.
*H04L 12/28* (2006.01)

(52) U.S. Cl. .................................. 370/234; 370/399
(58) Field of Classification Search ........ 370/229–236,
370/395.1, 397, 399, 395.2, 395.21–395.43,
370/396, 395.71, 400, 407–410, 412, 413,
370/236.1, 230.1, 231, 230, 232, 462, 389,
370/426, 377–414, 428, 352, 416, 468
See application file for complete search history.

(56) References Cited

U.S. PATENT DOCUMENTS

| 5,555,265 A | * | 9/1996 | Kakuma et al. ........ 370/395.43 |
| 5,557,608 A | * | 9/1996 | Calvignac et al. .......... 370/389 |
| 5,745,697 A | * | 4/1998 | Charny et al. ............... 370/231 |
| 5,754,530 A | * | 5/1998 | Awdeh et al. ............. 370/236.1 |
| 5,774,453 A | * | 6/1998 | Fukano et al. ............... 370/231 |
| 5,850,399 A | * | 12/1998 | Ganmukhi et al. .......... 370/412 |
| 5,872,769 A | * | 2/1999 | Caldara et al. .............. 370/230 |
| 5,953,338 A | * | 9/1999 | Ma et al. .................... 370/377 |
| 5,959,993 A | * | 9/1999 | Varma et al. ............... 370/397 |
| 6,009,078 A | * | 12/1999 | Sato ........................... 370/232 |
| 6,046,981 A | * | 4/2000 | Ramamurthy et al. ...... 370/232 |
| 6,163,542 A | * | 12/2000 | Carr et al. ................ 370/230.1 |
| 6,167,049 A | * | 12/2000 | Pei et al. ..................... 370/230 |
| 6,212,162 B1 | * | 4/2001 | Horlin ......................... 370/229 |
| 6,212,163 B1 | * | 4/2001 | Aida ........................... 370/230 |
| 6,226,264 B1 | * | 5/2001 | Shibata et al. .............. 370/232 |
| 6,252,851 B1 | * | 6/2001 | Siu et al. .................... 370/236 |
| 6,272,109 B1 | * | 8/2001 | Pei et al. ..................... 370/230 |
| 6,324,165 B1 | * | 11/2001 | Fan et al. .................... 370/232 |

* cited by examiner

*Primary Examiner*—Duc Ho
*Assistant Examiner*—Phuongchau Ba Nguyen
(74) *Attorney, Agent, or Firm*—Marks & Clerk; Richard J. Mitchell

(57) ABSTRACT

There is provided a method for transmitting non-real time traffic in a connection oriented communications network. The network includes a network core that has a source and a destination with a path between them. The non-real time traffic is received at the source from a number of connections and each of the connections is associated with one of many classes of transmission service. The method includes the first step of aggregating at the source the non-real time traffic received from the connections onto the path. The non-real time traffic is transmitted on the path without regard to the connections with which the non-real time traffic is associated. The method includes the second step of segregating at the destination the non-real time traffic so transmitted on the path within the core according to the corresponding connections with which the non-real time traffic is associated. Flow control is applied between the source and the destination to thereby regulate the rate of transmission of the non-real time traffic along the path.

21 Claims, 6 Drawing Sheets

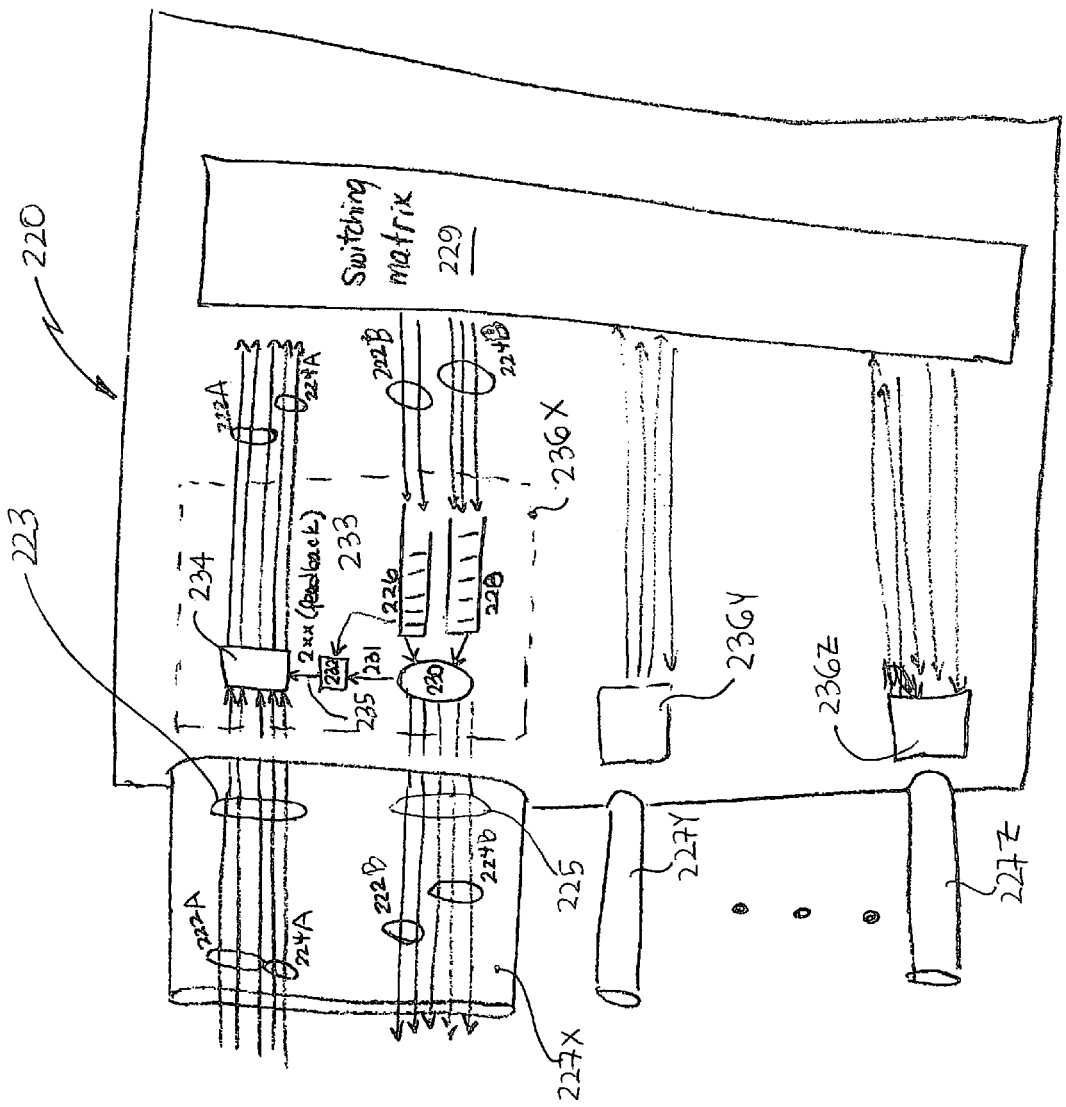

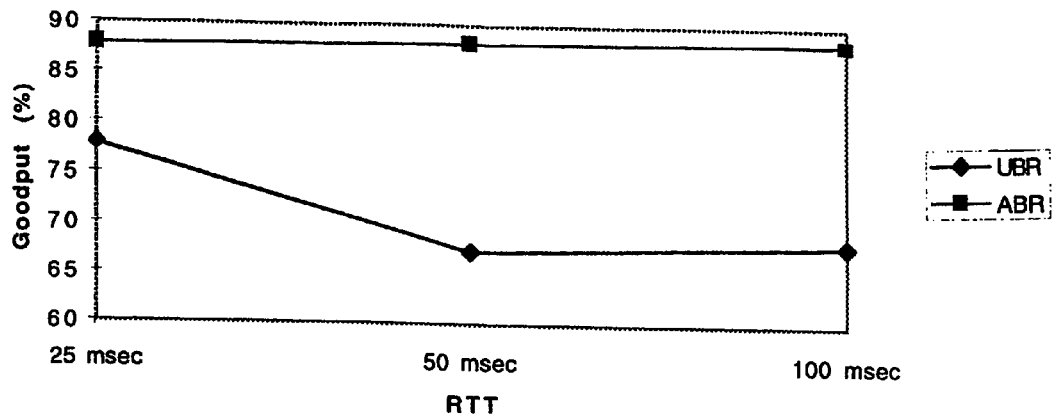
Figure 6 • Goodput Performance with Constant Switch Buffer Size
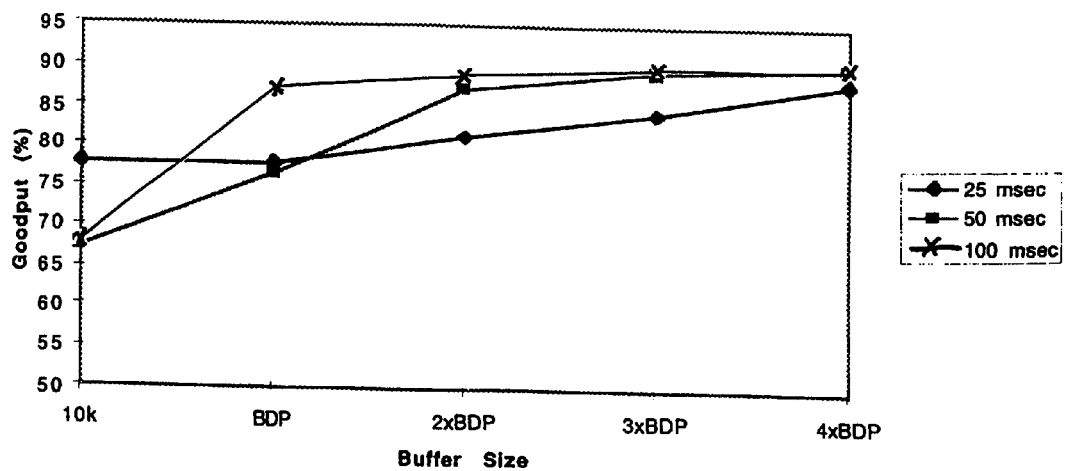
Figure 7 • UBR Goodput with Various Switch Buffer Sizes

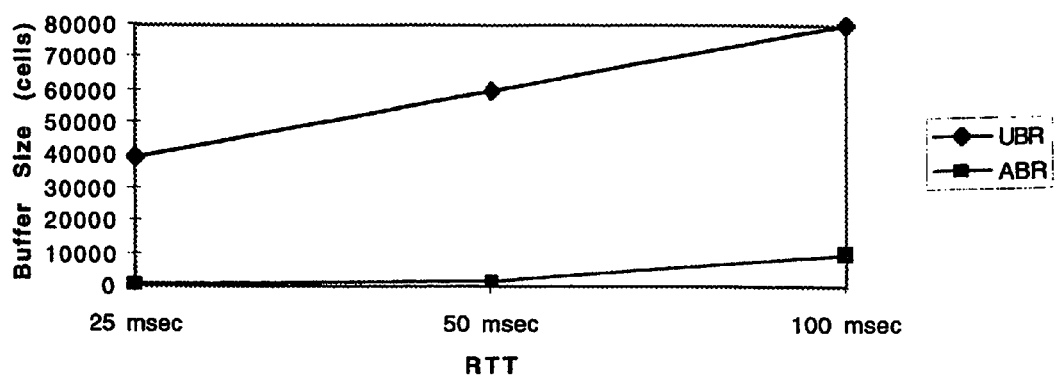
Figure 8 • Switch Buffer Requirements to Achieve Equivalent Goodput Performance

METHOD AND APPARATUS FOR PROVISIONING TRAFFIC DEDICATED CORES IN A CONNECTION ORIENTED NETWORK

FIELD OF THE INVENTION

The invention relates generally to the field of connection oriented communications networks and more particularly, to the design of core networks and switches therefor and methods for the aggregation of connections onto such core networks.

BACKGROUND OF THE INVENTION

The emergence of the Asynchronous Transfer Mode (ATM) networking protocol is a response to the demand for faster data communications and more sophisticated processing. The ATM protocol relates to a cell-based switching and multiplexing, technology and is designed to be a general purpose transfer mode for a wide range of traffic services. Communications networks now serve a range of new applications involving mixed media traffic comprising data, voice, still and moving images and video. ATM is a technology designed for flexibility to enable the carriage of multiple and previously segregated traffic over a single, common backbone infrastructure. The aim of the ATM networking protocol is to provide a more flexible facility for the transmission of such traffic and for the allocation of transmission bandwidth in order to efficiently utilize network resources.

Another goal of ATM network design is to provide a backbone network capable of accommodating differentiated services in a scalable manner. In order to maximize the efficiency of an ATM network, network designers provision ATM networks in which a consolidated backbone network is shared among differentiated services. Yet other goals of network design are to maximize utilization of provisioned links, maximize statistical gains and reduce network management complexity.

The ATM networking protocol is particularly advantageous in that it provides network administrators and end users with multiple classes of communications service in order to accommodate the various service requirements of different applications. The ATM Forum Traffic Management Working Group has defined five service categories for cell transmission, also referred to herein as classes of transmission service, which are distinguished by parameter sets used to describe source behaviour and quality of service (QoS) guarantees. These service categories are identified as constant bit rate (CBR), real time variable bit rate (rtVBR), non-real time variable bit rate (nrtVBR), available bit rate (ABR) and unspecified bit rate (UBR), all of which are set out in the "ATM Forum Traffic Management Specification", Version 4.0, which was published by the ATM Forum Technical Committee under document no. af-tm-0056.000 in April 1996 ("the Traffic Management Specification"). The above five service categories can be grouped more generally into real time and non-real time service categories, with CBR and rt-VBR constituting the real time group and nrt-VBR, ABR and UBR constituting the non-real time group. While other service categories may be proposed or adopted over time, these can likewise be expected to be differentiated into real time and non-real time groups.

The ABR and UBR service categories of ATM networking are intended to carry data traffic which has no specific cell loss or delay guarantees. The UBR service category is the simplest of the two, as it optionally provides only a guaranteed minimum cell rate. The ABR service category provides source to destination flow control that attempts, but is not guaranteed, to achieve zero cell loss. Thus, the ABR service category offers users a relatively high quality of service in terms of cell loss probability and yet seeks to maintain high network resource utilization. Traffic management techniques such as those adopting flow control are used to protect a network and its various end-systems from congestion in order to achieve network performance and utilization objectives.

ATM cell traffic between nodes in an ATM network is carried on what are known as virtual connections (VC). Traffic from end user to end user through a plurality of intermediate nodes is carried on Virtual Channel Connections (VCC). VCCs may carry different categories of traffic (eg. voice, video, data) which are required to be transmitted with specific service guarantees. Often, VCCs having different sources and different destinations will nevertheless share network resources for portions of their respective connections. This is particularly true in the backbone or core of a network in which traffic from many sources is merged onto higher capacity connections. In the prior art, where several VCCs share portions of a network, it has been known to combine VCCs which have identical quality of service (QoS) requirements onto Virtual Path Connections (VPC) in order to simplify the processing of traffic on these portions of the network. When different VCCs do not share the same ultimate destination, it is necessary to reconstitute the VCCs at the termination point or destination of the VPC. One of the objectives of combining VCCs having identical QoS requirements onto VPCs is to enable the nodes in the VPC to handle the traffic in a manner such that the VCCs are transparent, i.e., ATM cells on a VPC are processed essentially without regard to the VCC with which they are associated. The aggregation of VCCs onto VPCs reduces network management complexity and can increase utilization of provisioned links.

Because the component VCCs of a prior art backbone VPC have identical quality of service requirements, it is not necessary to perform traffic management functions in the VPC at the VCC level. That is, all traffic in the VPC may be treated identically without regard to the VCC. This simplification is generally believed to allow for faster and more efficient transmission of the traffic since traffic management functions may be performed at the VPC level. Thus, where several VPCs are being carried over a physical link in a network, arbitration may be performed between the VPCs instead of the VCCs. Since there will be fewer VPCs than VCCs, the traffic management function is simplified. As well, since the use of backbone VPCs requires that all traffic in a single VPC be treated in the same manner, it is usual to combine VCCs of a given category of service onto dedicated VPCs which provide the appropriate service guarantees identically corresponding to the underlying VCC traffic.

Where VCCs having many different level of service requirements are present, in the prior art multiple VPCs are provided in order to furnish those levels of service to the VCCs. For instance, in the prior art networks it is necessary to provide more than one non-real time VPC in order to accommodate the different levels of service required by the various categories of non-real time connections. Some non-real time connections may need a guarantee of a minimum transmission rate, while others may not require any transmission rate guarantees and may be serviced on a best effort basis only. Separate VPCs are therefore provisioned in prior art networks in order to accommodate these varying service requirements. It will be appreciated that the provisioning of VPCs having multiple classes of service in the core or backbone of an ATM network tends to increase the complexity of the traffic management functions performed by the nodes therein.

There is therefore a need in a connection oriented network to provide a method for combining many non-real time connections having various levels of service requirements onto a single path such that the traffic on the path may be managed without regard to the particular level of service of each connection. There is also a need to establish connections and paths in a connection oriented network according to a method which allows for a high degree of network resource utilization but still ensures that the various levels of service associated with the connections are met.

SUMMARY OF THE INVENTION

In a first aspect, a method for transmitting non-real time traffic in a connection oriented communications network is provided. The network includes a network core which includes a core source and a core destination, the core source and the core destination having a path therebetween, the path having one of a plurality of classes of transmission service. The non-real time traffic is received at the core source from a plurality of connections and each of the connections have one of the plurality of classes of transmission service such that at least two of the connections do not respectively have a same class of transmission service. The method includes the step of, at the core source, aggregating the non-real time traffic received from the connections onto the path, the non-real time traffic being transmitted on the path without regard to which of the connections the non-real time traffic is associated and without regard to the class of transmission service of such connections. The method further includes the step of, at the core destination, segregating the non-real time traffic so transmitted on the path according to which of the connections the non-real time traffic is associated. Flow control is applied between the core source and the core destination to thereby regulate the rate of transmission of the non-real time traffic along the path. The path is also provisioned with a guaranteed transmission bandwidth.

The connection oriented communications network may be an ATM network, the plurality of connections may be Virtual Channel Connections (VCCs), the path may be a non-real time Virtual Path Connection (VPC), the non-real time traffic may be ATM traffic and the classes of transmission service may be ATM service categories.

The flow control applied between the core source and the core destination may include a flow control algorithm whereby the rate of transmission of the non-real time traffic on the path is regulated by providing feedback information to the core source concerning congestion at a contention point on the path.

The flow control applied between the core source and the core destination may include a flow control algorithm whereby the rate of transmission of the non-real time traffic on the path is regulated by providing an explicit rate of transmission to the core source.

The non-real time Virtual Path Connection may operate according to an Available Bit Rate (ABR) service category.

At least one of the connections aggregated onto the path may be provisioned with a guaranteed bandwidth and the guaranteed transmission bandwidth of the path may be obtained by summing the guaranteed transmission bandwidths for the connections aggregated onto the path.

The guaranteed transmission bandwidth for the connections may be a guaranteed minimum transmission bandwidth and the guaranteed transmission bandwidth for the path may be a guaranteed minimum transmission bandwidth.

The transmission bandwidth in the network core may be allocated between real time traffic and non-real time traffic and a share of the transmission bandwidth in addition to the guaranteed minimum transmission bandwidth for the path may be made available to the path if the transmission bandwidth allocated to the real time traffic is unused.

A share of the transmission bandwidth in addition to the guaranteed minimum transmission bandwidth for one of the plurality of connections may be made available the connection if the transmission bandwidth allocated to another of the connections is unused.

The core source to core destination flow control applied between the core source and the core destination may be provided by a plurality of ABR flow control segments between the core source and the core destination.

The core source may Her include a set of queues each corresponding to one of the classes of transmission service that are associated with the plurality of connections. The non-real time traffic received over the connections may be queued in the queue associated with the class of transmission service associated with each connection before aggregating the non-real time traffic onto the path.

The core source may further include a queue for each of the connections and the non-real time traffic received over the connections may be queued in the queue associated with the connection before aggregating the non-real time traffic onto the path.

Traffic management may be applied to the non-real time traffic at the core source.

The traffic management may include scheduling of the connections onto the path.

In a second aspect, a network entity for use in a connection oriented communications network is provided. The communications network includes a network core wherein traffic entering the network core is aggregated from connections onto paths within the network core. Traffic exiting the network core is segregated from the paths onto connections outside the network core. The traffic includes real time traffic and non-real time traffic. The real time traffic and the non-real time traffic are aggregated onto respective real time paths and non-real time paths. Each of the non-real time paths has a class of transmission service. Each of the connections carrying non-real time traffic has a class of transmission service such that at least two of the connections aggregated onto a non-real time path do not respectively have a same class of transmission service. Each of the non-real time paths is provisioned with a guaranteed transmission bandwidth. The real time traffic on each real time path is transmitted from a corresponding core source to a corresponding core destination according to a first class of transmission service and the non-real time traffic on each non-real dime path is transmitted from a corresponding core source to a corresponding core destination according to a second class of transmission service. Flow control is applied between the core source and the core destination corresponding to each non-real time path to thereby regulate the rate of transmission of the non-real time traffic along the non-real time path. The network entity includes a first queue for storing real time traffic received at the network entity over at least one of the real time paths and a second queue for storing non-real time traffic received at the network entity over at least one of the non-real time paths. The network entity also includes a scheduling mechanism for servicing the first and second queues to thereby respectively generate non-real time traffic and real time traffic in an outgoing direction and a flow control mechanism for regulating the rate of transmission of the non-real time traffic received at the network entity along each of the non-real time paths.

In a third aspect, a connection oriented communications network is provided. The communications network includes a network core, traffic entering the network core is aggregated from connections onto paths within the network core and traffic exiting the network core is segregated from the paths onto connections outside the network core. The traffic includes real time traffic and non-real time traffic. The non-real time traffic which enters the network core and is aggregated onto a path is received from connections that each have a class of transmission service such that at least two connections have classes of transmission service different from each other. The real time traffic and the non-real time traffic are each aggregated onto respective real time paths and non-real time paths. Each of the non-real time paths have one of the classes of transmission service and is provisioned with a guaranteed mission bandwidth. The real time traffic on each real time path is transmitted from a corresponding core source to a corresponding core destination according to a first class of path transmission service and the non-time traffic on each non-real time path is transmitted from a corresponding core source to a corresponding core destination according to a second class of path transmission service. Flow control is applied between the core source and the core destination corresponding to each non-real time path to thereby regulate the rate of transmission of the non-real time traffic along each non-real time path.

BRIEF DESCRIPTION OF THE DRAWINGS

For a better understanding of the present invention and to show more clearly how it may be carried into effect, reference will now be made, by way of example and not of limitation, to the accompanying drawings which show preferred embodiments of the present invention and in which:

FIG. 5 is a diagram of a network element according to another preferred embodiment of the present invention;

FIG. 6 is a graph of simulation results showing the goodput performance of ABR and UBR VPCs for different round trip time (RTT) delays;

FIG. 7 is a graph of simulation results showing the goodput performance of a UBR VPC core for various round trip time delays and core switch buffer sizes; and FIG. 8 is a graph showing the core switch buffer sizes required in a simulated UBR VPC core in order to achieve goodput performance equivalent to a simulated ABR VPC core for various round trip time delays.

DETAILED DESCRIPTION OF THE PREFERRED EMBODIMENT

Figure 1:
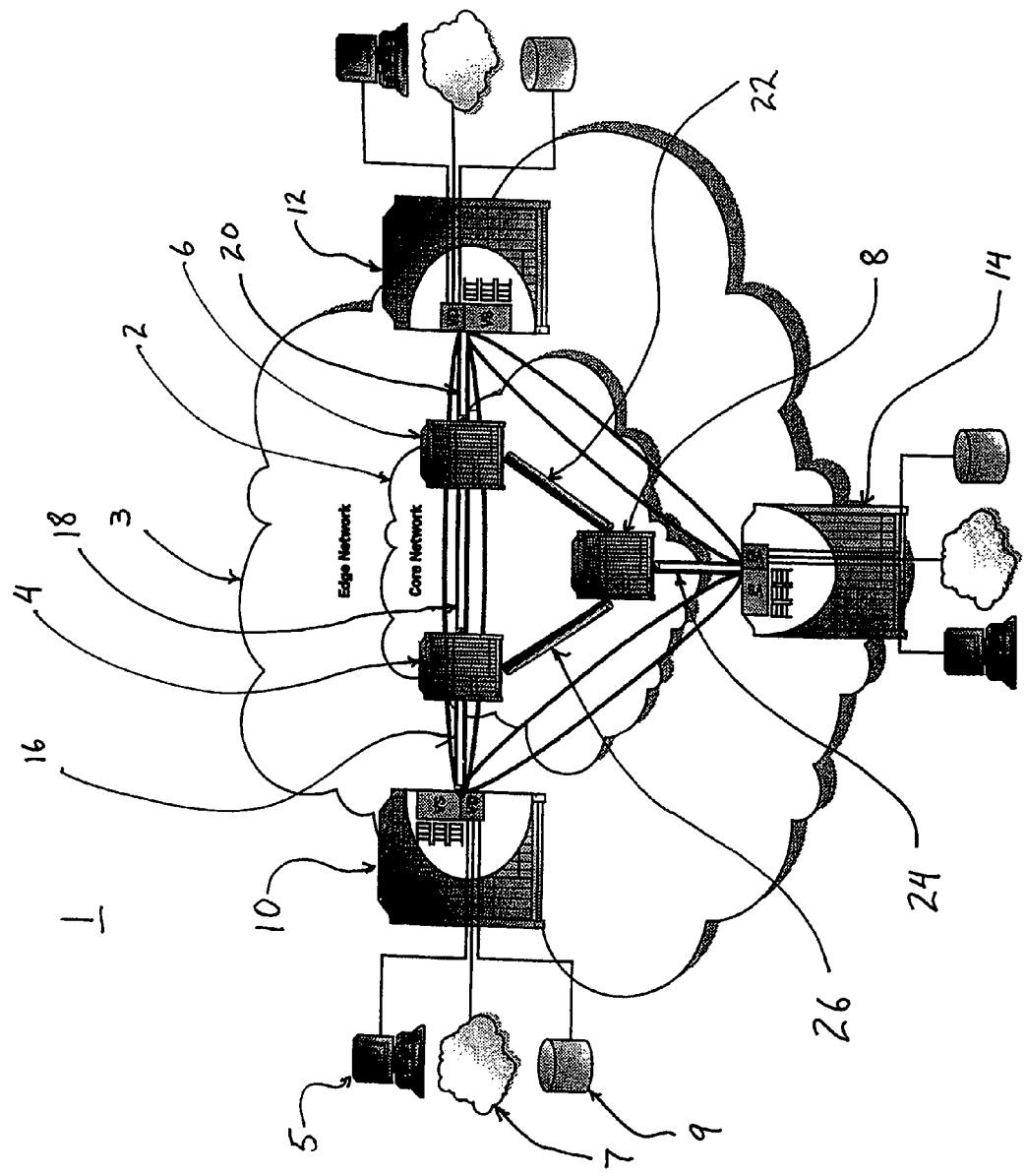
FIG. 1 is a network diagram of a portion of an ATM network having a surrounding network and a core network according to a preferred embodiment of the present invention.

The details of a preferred embodiment of the invention may be appreciated by referring to FIG. 1 which shows an ATM network 1 according to the preferred embodiment. The ATM network is an example of a connection oriented communications network in which the invention may be implemented. The ATM network 1 of FIG. 1 has a network core 2 having core nodes 4, 6, 8, and a surrounding network 3. Between the network core 2 and the surrounding network 3 are edge nodes 10, 12, 14. Traffic in the network core 2 is carried on paths which are capable of carrying several component connections. In the preferred embodiment, Virtual Path Connections (VPCs) are used as paths in the network core 2. The edge nodes 10, 12, 14 connect various component connections to the network core 2. The component connections are each associated with one of a plurality of classes of transmission service. Preferably, the component connections are Virtual Channel Connections (VCCs). The VCCs are aggregated onto the VPCs in the core network at the edge nodes 10, 12, 14.

Each VPC in the network core 2 has a source or aggregation point at which the VPC is originated and a destination or segregation point at which the VPC is terminated. Component VCCs are aggregated onto a VPC at the aggregation point. The VPC provides a connection between the aggregation point and the segregation point. The VPC is segregated into the component VCCs at the segregation point where the VCCs are typically then routed towards their ultimate destinations. The edge nodes 10, 12, 14 delimit the edge of the network core 2 and the surrounding network 3, and serve as aggregation/segregation points for VPCs in the core network 2.

The ATM network 1 and the network core 2 may each be capable of carrying real time VPCs, such as CBR and rtVBR categories, in addition to non-real time VPCs. However, for sake of simplicity, only non-real time VCCs and VPCs are shown in FIG. 1. The ATM network 1 is capable of carrying traffic from various types of connections which are each associated with one of a plurality of classes of transmission service. In other words, each of the connections may have different quality of service requirements. For instance, in the example of FIG. 1, the connections such as nrtVBR VCC 5, ABR VCC 7 and UBR VCC 9 are associated with different service categories and are connected to the edge nodes 10, 12, 14.

As described above, all traffic management for individual VCCs is performed at the aggregation points of the component connections. Such traffic management includes buffering, arbitration and VCC establishment procedures to allocate the assigned bandwidth in the path to the various connections. Specifically in the preferred embodiment, this occurs at the edge nodes 10, 12, 14. Preferably, these edge nodes have buffering capabilities. Any traffic management, shaping and arbitration in the network core 2 is done only at the VPC level. That is, these functions are performed in the network core 2 without the need to differentiate among the VCCs being carried on the same VPC, even if the VCCs have different quality of service requirements. Thus, the non-real time traffic is transmitted over the VPCs within the core network 2 without regard to the identity of the connections and associated class of transmission service with which the component non-real time traffic is originally associated prior to aggregation. Service guarantees are preferably enforced at the aggregation points such that nodes in the network core do not need to consider the level of service required by the individual non-real time connections being carried on the path. The service guarantees are achieved by a combination of the flow control performed by the core network, minimum guaranteed bandwidths allocated for the paths and the traffic management functions performed at the aggregation points.

The guaranteed bandwidth corresponding to a path normally represents the cumulative guaranteed bandwidths for each non-real time connection carried on the path. Where additional bandwidth becomes available, the flow control performed in the core network allows the sources at the edge of the network to increase the transmission rates onto the paths. The edge aggregation points allocate any such additional available bandwidth on the path to the component non-real time connections that are combined onto that path. This allocation may be performed according to an allocation scheme that satisfies the service requirements of the non-real time connections and fairness considerations, if desirable. In other words, each component connection receives its minimum guaranteed share of bandwidth and extra bandwidth is divided among the component connections according to a given fairness policy. Because a minimum transmission rate is provided on the paths in the core network, the edge nodes may perform all of the arbitration that is required between the non-real time connections such that arbitration between these connections does not have to be performed within the core network.

In the preferred embodiment the network core 2 supports ABR VPC, as described in greater detail below. Using flow control, the network core 2 preferably is intended to be lossless. That is, no traffic is expected to be lost within the ABR control loop and no cells are expected to be discarded from queues in the core or at contention points therein due to congestion in the VPC core, provided the VP aggregation points react appropriately to the flow control. A lossless VPC core can be obtained preferably by using ER ABR flow control which responds quickly to potential congestion in the core network 2 by lowering transmission rates at the relevant edge aggregation points 10, 12, 14. Thus, these aggregation points are provided with explicit feedback information for determining the relevant rates of transmission for each path in the core. The ER ABR flow control may also control the rates of transmission of the core nodes 4, 6, 8 in order to prevent a particular node in the core network 2 from becoming overloaded. In such a case, some core network nodes may intercept the network feedback information and perform the appropriate transmission rate adjustment. If so, the control loop from aggregation point to segregation point will be divided into subloops or ABR flow control segments, where the core network nodes act as virtual sources and virtual destinations with respect to ABR flow control. This is explained in greater detail below. Although the network core 2 is preferably lossless, it will be appreciated that the method of the invention may also be used in a core in which some cell loss is tolerated.

As described above, when the ABR service category is used for the VP core, paths are provisioned with a guaranteed minimum cell rate (MCR). As long as a connection complies with the specific traffic parameters of the traffic contract established when the connection is provisioned, traffic sent on the connection will be expected to be delivered at least at the MCR. Likewise, for other non-real time connections that are established with some bandwidth guarantee (e.g. MCR for GFR connections or SCR/MBS/PCR for VBR connections), these connections will achieve their QoS objectives so long as they comply with the behaviour prescribed for their particular associated service categories.

The complexity of traffic management within the network core 2 will depend upon the number of VPCs in the core, the number of different service categories supported in the core, and the arbitration schemes used at the nodes in the core. Separate VPCs are provided for real time and non-real time traffic in the network core 2. By providing a separate VPC or VPCs for real time traffic, the required bandwidth for the real time traffic may be set aside or reserved for the real time VPCs and remaining bandwidth on the physical connection in the network may be made available to other VPCs carrying the non-real time traffic. While guaranteeing some minimum amount of bandwidth for the non-real time connections, the amount of additional bandwidth available to the non-real time connections is therefore dynamic and depends upon the volume of real time traffic on the shared physical connection in the network. The amount of bandwidth available to the non-real time VPCs in the preferred embodiment is dynamically adjusted by employing the ABR service category for all non-real time VPCs in the core network 2. Thus, the non-real time VPCs in the network core 2 are preferably ABR VPCs. The ABR VPCs 16, 18, 20, 22, 24, 26 are shown in FIG. 1. Real time VPCs are not shown in FIG. 1, as previously explained.

As mentioned previously, flow control is provided in the network core 2. Various mechanisms can be used in order to achieve flow control in a network. These mechanisms can be classified broadly depending on the congestion monitoring criteria used and the feedback mechanism employed. The feedback mechanisms are either binary in nature or provide an explicit rate of transmission. The preferred feedback mechanism for flow control in the preferred embodiment is the explicit rate feedback mechanism, but those skilled in this art will understand that other mechanisms of flow control may be utilized with the present invention. For instance, binary flow control schemes may be used for the feedback mechanism. As well, the feedback mechanism may consist of ATM Block Transfer (ABT), as described in international standard ITU-T 1.371, or Transfer Control (CT).

In explicit rate feedback schemes, a network element such as a switch will perform three important functions. First, the switch will determine its load and determine the amount of bandwidth available to be shared. By way of example, this can be done either by monitoring queue lengths or queue growth rates associated with buffering incoming cells. Second, at each queuing point the switch will compute the fair share of the network bandwidth that can be supported for each contending connection (VP or VC) sharing the bandwidth, based on some fair share policy. In the case of core nodes, the determination is made for each path or VPC. Third, an actual explicit rate of transmission for the connection will be determined by the switch and this information will be sent to the source. Examples of explicit rate switch mechanisms known to those skilled in this art are Congestion Bias (CB), Bandwidth Tracking (BT) and Detailed Rate Accounting (DRA). Other appropriate explicit rate mechanisms may be used in the core network 2.

Two of the features of ABR are dynamic bandwidth allocation and end-to-end flow control. These features work together such that when additional bandwidth becomes available to an ABR connection, flow control permits traffic to be transmitted thereon at an increased rate. Likewise, when the additional bandwidth is no longer available, flow control will operate to reduce the rate of traffic transmission. Flow control in the ABR service category is achieved by arranging for the originating endpoint or source of an ABR control loop to send special resource management (RM)

cells through the network. The RM cells are typically interleaved with data cells in the network, and are turned around towards the originating endpoint once they reach the terminating endpoint or destination of the control loop. Each network element within the control loop, for instance a switch or other node in the network, may indicate its congestion status by writing into the RM cell in the backward data path of the connection. The RM cell is then forwarded on to the next network element in the backward data path. The network entities in the backward data path may update information into the RM cell, which is ultimately received by the originating endpoint. A network element employing ER techniques modifies the content of the RM cell only if it cannot support the rates identified in it for that connection. The originating endpoint of the control loop may then adjust its sending rate in response to the information contained in the received RM cell. The details of the flow control information contained in an RM cell and the behaviour of an originating control loop endpoint in response to the flow control information are well-known to those skilled in this art. If all sources, such as the edge nodes 10, 12, 14, comply with the flow control in the RM cells, the congestion in the core network may be reduced and the cell discard rates lowered or eliminated.

Explicit rate algorithms have been developed in order to fairly distribute bandwidth between ABR connections. Typically, an explicit rate algorithm may be deployed at every contention point in a data path. A contention point is any queuing point in the network where the aggregate arrival rate of cells can be instantaneously greater than the aggregate service rate, namely the rate available to all connections. The aggregate service rate will vary with time. The ER algorithm attempts to fairly distribute bandwidth between ABR connections at each contention point. A network element such as a switch may have one or more contention points.

On the establishment of an ABR connection, both a minimum required bandwidth and a maximum useable bandwidth are specified. These are designated typically as the minimum cell rate (MCR) and the peak cell rate (PCR), respectively. ABR flow control occurs between an originating endpoint and a terminating endpoint, as described previously. The originating endpoint (e.g., the VPC aggregation point 102) and the terminating endpoint (e.g., the VPC segregation point 104) are connected via bidirectional connections. For each such bidirectional ABR connection, every connection endpoint acts both as a source and a destination. For the forward flow of information from originating endpoint to terminating endpoint there exists a control loop consisting of two RM cell flows, one in the forward direction and one in the backward direction. The same holds true for the backward information flow from terminating endpoint to originating endpoint.

Like any typical feedback control system, the delay in the feedback loop is important in determining the performance of the controlled system. In the case of the ABR service category which uses explicit rate flow control, the bandwidth fair share is marked into the backward RM cell if its value is less than what is being already carried inside the cell. As such, the originating endpoint of the control loop will always receive the lowest explicit rate values as offered by the nodes that the connection traverses. Thus, the faster the backward RM cells travel back to the originating endpoint, the quicker the source can respond to the bottleneck rate and hence the better the performance of the feedback mechanism.

Figure 2:
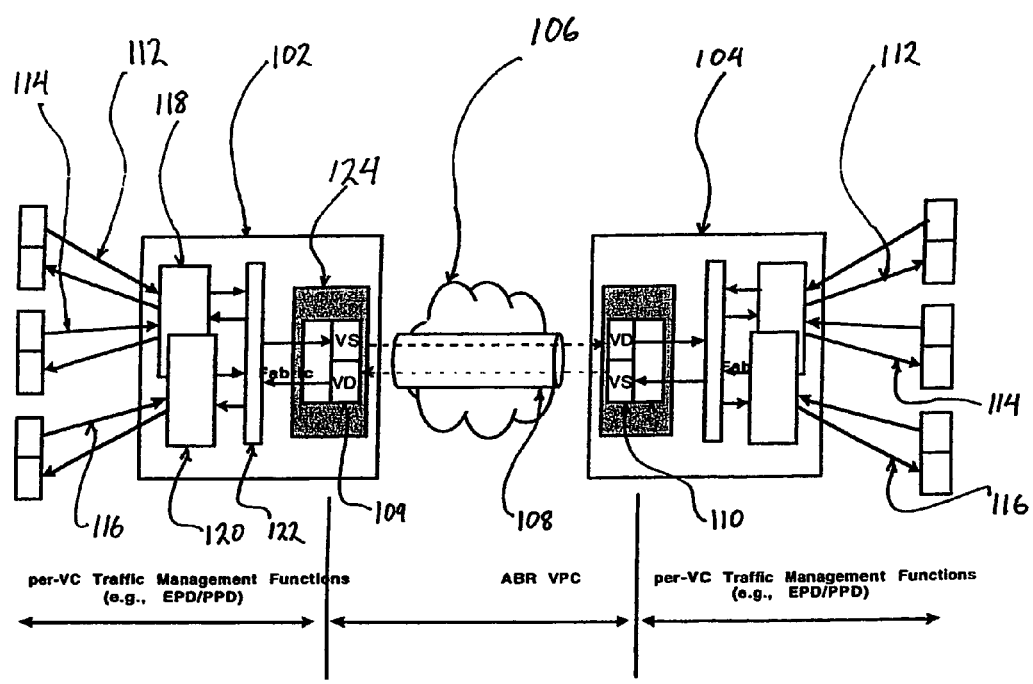
FIG. 2 is a block diagram showing end to end connections over a Virtual Path Connection (VPC) in the core network of the ATM network of FIG. 1.

Referring now to FIG. 2, the details of the preferred embodiment can be more readily appreciated. A VPC aggregation point 102 and VPC segregation point 104 are connected by a VPC network core 106 supporting ABR VPCs 108 which carry non-real time traffic including VCCs 112, 114, 116. The VPC aggregation point 102 is the originating endpoint for the ABR VPC 108 and the VPC segregation point 104 is the terminating endpoint for the ABR VPC 108. Those skilled in the art will appreciate that the ABR VPC 108 may be comprised of a series of connections between several nodes within the core network 2 which provide a point to point connection between the VPC aggregation point 102 and the VPC aggregation point 104. Alternatively, the VPC aggregation point 102 and the VPC segregation point 104 may be the only nodes in the ABR VPC 108. Additional VPC aggregation points and additional VPCs, including real time VPCs, may be present in the VPC network 106 but are not shown for sake of simplicity. The aggregation points such as VPC aggregation point 102 are located on the edge nodes as they represent the transition point between the surrounding network and the VPC network 106 which is a network core like the network core 2 of FIG. 1. Non-real time VCCs 112, 114, 116, are received at the VPC aggregation point 102 and aggregated onto the ABR VPC 108. The VPC termination point 104 segregates the VCCs 112, 114, 116 and routes them to their respective destinations.

An ABR flow control loop is provided in the ABR VPC 108. The flow control loop is originated and terminated in each of the VPC aggregation point 102 and the VPC termination point 104 by a Virtual Source/Virtual Destination (VS/VD) 109 and Virtual Destination/Virtual Source (VD/VS) 110. Each Virtual Source and Virtual Destination performs the same functions as previously generally described for ABR originating endpoints and terminating endpoints. Thus, the VS/VD 109 of the VPC aggregation point 102 generates forward RM cells (FRM cells) which are turned around by the VD/VS 110 and sent back to the VS/VD 109 as backward RM (BRM) cells. The BRM cells carry feedback information provided by the VPC termination point 104 and other nodes in the ABR VPC 108 back to VPC aggregation point, the source of the ABR VPC 108. Among the feedback information in the BRM cells is the explicit rate (ER) information. The virtual source in VS/VD 109 adjusts its transmission rate according to the ER information contained in received BRM cells.

All traffic management for the VCCs 112, 114, 116 is performed at the VPC aggregation point 102. The VCI information in the cell headers of the traffic in the VPC network 106 is transparent to the nodes in the VPC network 106. Thus, once aggregated onto a VPC, the VCCs are carried without regard to the individual service requirements of the various VCCs. Instead, traffic management functions and scheduling between individual VCCs are concentrated in the VPC aggregation point 102 in the VPC network 106. Per-VCC arbitration and isolation is performed at the VPC aggregation point 102 before the traffic received from incoming VCCs 112, 114, 116 is aggregated and transmitted on the ABR VPC 108. The incoming VCCs 112, 114, 116 may be ABR VCCs or may have other non-real time service categories such as nrt-VBR and UBR. As described in greater detail below, with appropriate traffic arbitration and shaping at the VPC aggregation point 102, the ABR VPC 108 is capable of carrying VCC traffic from each of these non-real time service categories and maintaining the Quality of Service (QoS) commitments made to the component VCCs 112, 114, 116. By aggregating non-real time VCCs of different service categories onto a common ABR VPC, the number of VPCs in the VPC network 106 may be reduced. Fewer VPCs in a core network is generally expected to reduce administrative complexity and increase link utilization.

The traffic management, arbitration and shaping of the VCC traffic at the VPC aggregation point 102 will now be discussed. As mentioned above, the ABR service category seeks to guarantee a minimum cell rate (MCR). The MCR of the ABR VPC 108 is the primary basis on which bandwidth is allocated to VCCs. The sum of the MCRs of all UBR and ABR VCCs plus the sum of the equivalent bandwidth of all nrt-VBR VCCs would not be expected to exceed the MCR of the ABR VPC 108 onto which those VCCs are aggregated. One exception to this occurs where overbooking of connections is used, in which case the aggregate MCR values and equivalent bandwidths of the VCCs may exceed the MCR and equivalent bandwidth of the ABR VPC 108. During a call set-up phase, the Connection Admission Control (CAC) preferably will not establish a VCC if the requested MCR (or equivalent) cannot be accommodated on the ABR VPC 108. The CAC is the software functionality in a node or switch in an ATM network that is responsible for determining whether a connection request is admitted or denied. This determination is based on the traffic parameters, including QoS, requested for the connection and the resources available. The CAC will only accept a connection request if the QoS for all existing connections would still be met if the request was accepted. Those skilled in the art will appreciate that the CAC function may be performed on a node-by-node basis or in a centralized fashion, and that CAC functions can be tuned for overbooking and underbooking. The set-up of connections by the CAC is well known to those skilled in the art.

In addition to the MCR there is an elastic or dynamic component to ABR flow control based on the amount of unused bandwidth in the nodes in the path of a connection. Typically, this additional available bandwidth is dependent upon the bandwidth requirements of real time connections which share network resources with the ABR VPCs. Thus, if additional bandwidth is available after satisfying the real time VPCs and the MCRs of the non-real time ABR VPCs, that additional bandwidth is allocated among the ABR VPCs in accordance with the particular ABR algorithm employed. Where additional bandwidth is made available to the ABR VPC 108 it is distributed at the aggregation point to the constituent VCCs 112, 114, 116 according to an appropriate fairness scheme. As well, some ABR VPCs may not need their allocated MCR at any given point in time. It is also possible in such circumstances, and with certain ER algorithms, to redistribute the unused bandwidth until it is required by the ABR VPC's to which it was originally allocated.

In the preferred embodiment buffering is provided at the VPC aggregation point 102 by buffers 118, 120 which contain queues (not shown) for queueing VCC traffic. Scheduling of the VCCs 112, 114, 116 may be performed in two stages. First, scheduling may be performed between the VCCs 112, 114, 116 at the output of the queues contained in the buffers 118, 120. Second, the outputs of the buffers 118, 120 may be provided to a scheduler 122 where a second level of scheduling is performed. It will be appreciated by those skilled in the art that fewer or more levels of VCC scheduling may be provided. It will also be appreciated that various schemes for allocating the available bandwidth between VCCs are possible and will be determined, in part, according to the traffic contracts associated with the VCCs and the relative priority or importance of the VCCs. Transmission of VP traffic onto the VP core network 106 is controlled by a VPC shaper 124. The VPC shaper 124 transmits cells onto the ABR VPC 108 at the rate determined by the ABR flow control. The VPC shaper 124 may have additional buffering capabilities for queueing the traffic before transmission on the ABR VPC 108. For simplicity, the VP network core 106 is shown as having only one VPC 108. It will be understood by those skilled in the art that the VP network core 106 may consist of multiple VPCs. Additional VPCs would be required to provide connections between the VPC aggregation point 102 and termination points other than VPC termination point 104. For example, additional VPCs would be required to carry real time traffic since the ABR VPC 108 does not provide the necessary QoS guarantees required for real time VCCs.

Therefore, all VCCs are carried transparently in the VPC network core 106. As mentioned previously, traffic is controlled within the VPC network core 106 without regard to the VCC with which the traffic is associated and without regard to the individual classes of transmission service associated with that component traffic. This may reduce the overhead required in managing the VPC network core 106. Because the flow of traffic onto the ABR VPC 108 is controlled in accordance with the available bandwidth, queue build up in the VPC network core 106 may be reduced. In addition, with appropriate ABR flow control, cell discard in the VPC network core 106 may be eliminated altogether, thereby also eliminating the need for performing frame discard at the VPC level. Furthermore, fairness between the component VCCs is enforced at the edge of the VPC network core 106 where the ABR loop starts and where most of the congestion occurs. At the edge, isolation between non-real time service categories may be achieved using appropriate service scheduling and per-VC traffic management functions. Thus, at the edge nodes, the QoS objectives for the different VCCs are achieved. The use of ABR flow control in the VPC network 106 makes the VPC network core 106 essentially lossless and therefore QoS is achieved end-to-end. By specifying acceptable transmission rates to the edge nodes through the ER ABR flow control, all QoS parameters for the individual VCCs should be controlled at the VPC aggregation point 102.

The performance of VCC traffic management and arbitration at the edge nodes of the VPC core network 106 means that the VPC network 106 is not relied upon for allocating bandwidth among VCCs. Available bandwidth is allocated according to a defined fairness policy at the edge of the network, for example at the VPC aggregation point 102. Known congestion management schemes such as those which aim to achieve per-VCC isolation may be performed at the edge. By way of example, two such congestion management schemes are Early Packet Discard (EPD) and/or Partial Packet Discard (PPD). Within the VPC core network 106, traffic management and arbitration is performed at the VPC level between VPCs, and bandwidth is allocated among VPCs, but as previously explained these functions are performed in the VPC network core 106 without regard to the individual VCCs in the VPCs.

Those skilled in the art will appreciate that appropriate buffering may be provided at the edge nodes such as at the VPC aggregation point 102 in order to accommodate the increased traffic congestion that must be handled due to the concentration of per-VCC traffic management and arbitration at the edge nodes of the VPC network 106. However, because of the flow control within the VPC network core 106, generally less buffering will be needed within the VPC network core 106. It will be appreciated that increased buffering at the edge nodes is not absolutely necessary. However, frame discard may be reduced by providing larger buffers at the edge nodes.

Bandwidth allocation between VCCs sharing the same VPC is also performed at the edge nodes. The VPC network 106 provides the edge nodes, such as the VPC aggregation point 102, with feedback information for specifying the available cell rate for the non-real time VPCs such as the ABR VPC 108. The edge nodes allocate the available cell rate of an ABR VPC among the component non-real time VCCs. The edge nodes may also perform traffic shaping for real time VPCs in the VPC network 102 according to known shaping procedures for real time connections. The Connection Administration Control (CAC) function discussed above is also preferably performed at the edge nodes. Thus, the determination of whether a VCC may be established and added to a VPC or whether a new VPC may be set up may be determined at the edge nodes.

Figure 3:
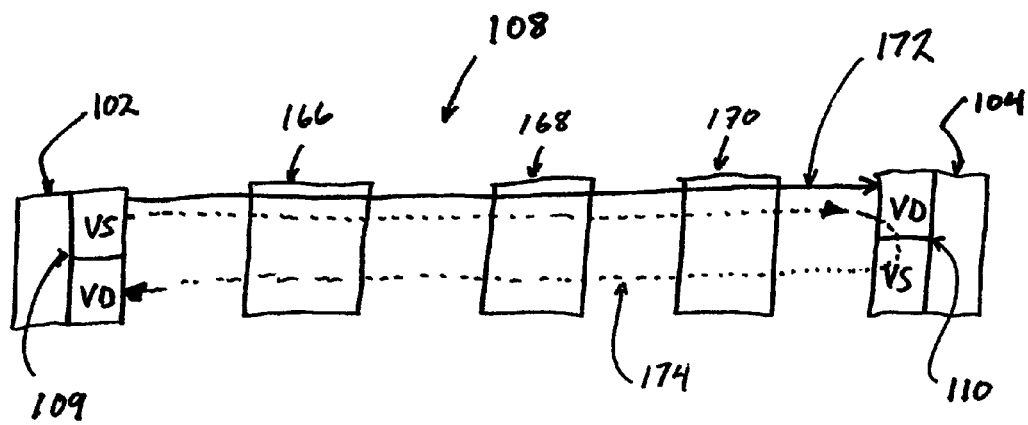
FIG. 3 is a block diagram representing a flow control loop for the VPC of FIG. 2.

FIG. 3 shows the ABR VPC 108 traversing a plurality of core nodes 166, 168, 170 between the aggregation point 102 and the VPC segregation point 104 and having a single flow control loop between VS/VD 109 and VD/VS 110. The core nodes 166, 168, 170 in the ABR VPC 108 do not have VS/VDs or VD/VSs. Traffic flow 172 in the ABR VPC 160 is indicated in FIG. 3 by a solid line passing from VS/VD 109 to VD/VS 164 through the core nodes 166, 168, 170. An ABR control loop 174 is indicated by a dotted line.

As mentioned above, it is desirable for the ABR flow control loop to be capable of reacting quickly to congestion in the ABR VPC 108 in order to keep the cell discard rate close to zero. Various techniques have been used in the prior art in order to minimize the ER information feedback delay as a backward RM cell travels through the nodes in an ABR loop. One technique involves segmenting an ABR loop by the creation of additional virtual sources and virtual destinations. This creates a concatenation of sequential virtual ABR control segments, wherein the feedback delay is reduced in each virtual loop. For example, the ABR control loop 174 in the ABR VPC 108 may be segmented into many loops by deploying further buffered VS/VDs and VD/VSs within the ABR VPC 108. Segmenting flow control loops allows the ABR VPCs in the VPC core network 106 to react more quickly to queue build-up in the core and increase transmission rates more quickly as bandwidth becomes available. Another known method of reducing ER information feedback delay involves the provision of a dedicated high priority queue in each contention point of a connection for the backward RM cells.

Figure 4:
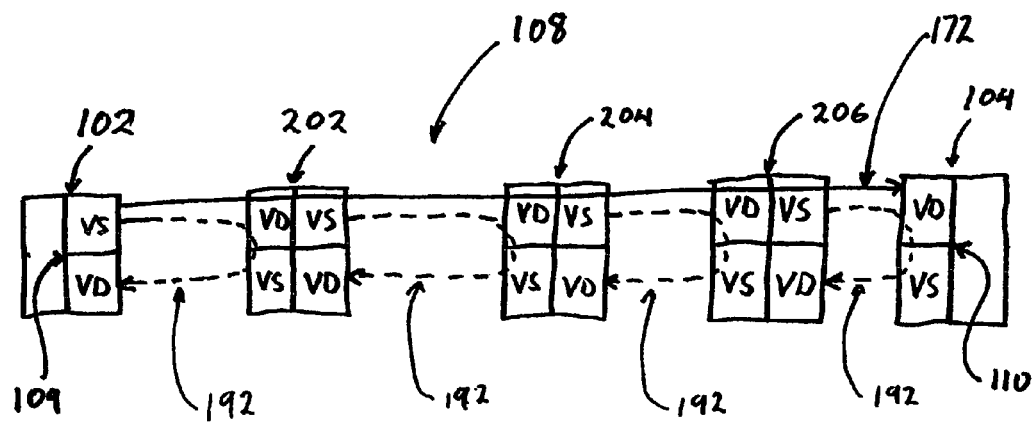
FIG. 4 is a block diagram representing a segmented flow control loop for the VPC of FIG. 2.

FIG. 4 shows the ABR VPC 108 having a segmented ABR flow control loop 192 as discussed above. The core nodes 202, 204, 206 in the ABR VPC 108 between the VPC aggregation point 102 and the VPC termination point 104 each have VS/VDs and VD/VSs which implement the segmented ABR flow control loop 192. It will be appreciated by those skilled in the art that the segmented ABR flow control loop 192 in FIG. 4 will generally be expected to provide more responsive ER ABR flow control than the single ABR flow control loop 174 of FIG. 3. The ABR flow control loop may be segmented into two or more flow control loops. It will be appreciated by those skilled in the art that if a segmented flow control loop is desired that it is not necessary for every node in the VPC to have a VS/VD or VD/VS.

A simplified network entity such as the network entity or element 220 of FIG. 5 may be used in a network core in which the methods of this invention are implemented. The network entity may be a switch, router or other network device wherein a contention point for network traffic may occur. For example the network element could be used in an ABR VPC core network in which all per-VC traffic management is performed at edge nodes, such as the network core 2 of FIG. 1 or the VPC network core 106 of FIG. 2. Because VCC arbitration is performed at the edge in these networks, the core network entity 220 only needs to support two service categories, for instance a first service category for VPCs carrying real time traffic and a second service category for VPCs carrying non-real time traffic. Real time VPCs 222A and non-real time VPCs 224A are received at one or more input ports 223 of the network entity 220. Real time VPCs 222B and non-real time VPCs 224B are egressed at one or more output ports 225 of the network entity 220. In the example according to FIG. 5, the input ports 223 and output ports 225 are provided by way of a bidirectional link 227X. Other bidirectional links 227Y, 227Z comprising corresponding input and output ports like those of the bidirectional link 227X may be provided for the network entity 220.

When received at the network entity 220, the incoming traffic on real time VPCs 222A and on non-real time VPCs 224A are processed by an ingress handling function 234 well known to those in this art. As explained in greater detail below, one of the features of the ingress handling function 234 is to mark feedback information into resource management (RM) cells of the non-real time traffic for effecting flow control of the non-real time traffic received at the network entity 220 along each of the non-real time paths or VPCs 224A. The feedback information is provided to the ingress handling function 234 as at 235 by means of a flow control mechanism 232 explained in greater detail below.

The incoming real time VPCs 222A and non-real time VPCs 224A proceed from the ingress handling function 234 and into switching matrix 229. Outgoing real time VPCs 222B and non-real time VPCs 224B emerge from the switching matrix 229 and are directed respectively into output queues 226 and 228. These output queues are discussed in greater detail below. In a preferred embodiment, the first service category for servicing the real time traffic is the CBR service category. When a request is made for the set up of a real time VPC a Peak Cell Rate (PCR) is requested. The CAC will establish the requested real time VPC if sufficient bandwidth is available in the network entity 220 and other nodes in the VPC to guarantee the PCR to the VPC. Because the CAC will not allow a real time VPC to be set up if the network entity 220 cannot guarantee the PCR, all real time VPCs may share the same queue without the risk of cell loss. The CAC will perform a similar function if a real time VCC is requested to be added to an existing VPC. Where overbooking of connections is utilized, the sum of the PCR values for all real time VCs will generally be less than the product obtained by multiplying the PCR value associated with the VP over which those VCs are aggregated by an overbooking factor, where the overbooking factor is a value greater than 1.

The second service category in the network entity 220 for VPCs carrying non-real time traffic may be the ABR service category. As described above, all non-real time VPCs in the core network 2 are preferably ABR VPCs. Thus, when a request is made to the CAC for the set up of a non-real time VPC, an MCR is requested. The CAC will establish the requested VPC if bandwidth is available in the network entity 220 to guarantee the MCR to the VPC. That is, if the sum of all PCR's of the established real time VPCs plus all MCRs of established non-real time VPCs leaves enough unreserved bandwidth in the network entity 220 to guarantee a requested PCR (in the case of real time VPCs) or MCR (in the case of non-real time VPCs) then the CAC will establish the requested VPC. As before, the measure of unreserved bandwidth may take overbooking into account.

As referred to previously two output queues, a CBR queue 226 and an ABR queue 228, may be provided in the network entity 220 for respectively storing real time traffic and non-real time traffic received at the network entity 220 over each of at least one of the real time and non-real time paths. All outgoing traffic received from the switching matrix 229 on the real time VPCs 222B is preferably queued in the CBR queue 226 and all outgoing traffic received from the switching matrix on the non-real time VPCs 224B is preferably queued in the ABR queue 228. The CBR queue 226 and the ABR queue 228 can be serviced by a simple 10 such as exhaustive servicing in which the queue scheduler 230 alternately services the CBR queue 226 and the ABR queue 228 to generate respective real time traffic and non-real time traffic in an outgoing direction, in this example through the output ports 225. According to the exhaustive servicing scheduling algorithm, at every service opportunity the CBR queue 226 is served if it is not empty. If it is empty, the ABR queue 228 is given a service opportunity. Exhaustive servicing scheduling algorithms are well known to those skilled in the art. Other scheduling techniques which preserve the real time characteristics of the real time path can also be used, for instance weighted fair queuing techniques.

Quality of Service for incoming traffic received at the input ports 223 over the non-real time VPCs 224A is ensured by a flow control mechanism 232 which may calculate the explicit rate information for the ABR flow control. The bit rates for each of the incoming non-real time VPCs 224A are controlled according to the congestion state of the network entity 220 and the congestion state of other network elements in the ABR control loop associated with the VPC. For instance, the flow control mechanism 232 may receive available bandwidth information from the queue scheduler 230 as at 231 and may receive queue status information from ABR queue 228 as at 233 in order to assess the congestion state of the network element 220. The queue status information may include queue depth or queue growth rate or both, to name some examples. By controlling the bit rates in the individual non-real time VPCs 224A, the network entity 220 ensures that incoming traffic is not arriving at a rate which overwhelms the servicing capacity of the network entity 220. The feedback mechanism 232 also ensures that the amount of traffic aggregated on the non-real time VPCs 224A does not exceed the bandwidth available to the non-real time VPCs 224A. In addition, the feedback mechanism 232 may cause additional available bandwidth to be apportioned to the non-real time VPCs 224A if the bandwidth required by the real time VPCs 222A is reduced. Bandwidth allocation among the non-real time VPCs may be determined according to an explicit rate ABR algorithm. Because bandwidth is set aside in the network entity 220 for the PCRs of the real time VPCs 222A and because the bit rates of the non-real time VPCs 224A are controlled by the feedback mechanism 232, cell discard is not expected to be required in either the CBR queue 226 or the ABR queue 228. Where ABR flow control is adopted as the flow control mechanism of the network entity 220, resource management (RM) cells are employed to embody and transmit explicit rate information to the respective sources of the non-real time traffic by way of the outgoing non-real time VPCs 224B.

The ingress handler 234, output queues 226 and 228, queue scheduler 230 and flow control mechanism 232 comprise a link handler 236X. Like link handlers 236Y and 236Z are provided respectively for each of the bidirectional links 227Y and 227Z. While the queues 226 and 228 have been described as output queues and the flow control mechanism 232 has been described as being based on the congestion state associated with the non-real time queue 228, those skilled in this art will appreciate that the invention may be applied to queues of the network entity 220 other than output queues. This may include input queues or queues provided at other buffering locations within the network entity 220. Such queues will likewise be provided in pairs, having one queue of each pair dedicated to real time traffic and the other queue thereof dedicated to non-real time traffic. In such circumstances, the flow control mechanism 232 may take into account congestion state information received from all or a subset of the other queues which are associated with non-real time traffic received at the network entity 220.

The elimination of a complex congestion management function such as frame discard and the implementation of a scheduling scheme of relatively reduced complexity each contributes to simplifying the function of the VP core network entity 220. For instance, as those skilled in the art will appreciate, exhaustive servicing is a relatively simple scheduling algorithm which generally requires less computational overhead than other more complicated scheduling algorithms (e.g. weighted fair queuing). This simplification of function may allow for higher efficiency in the network entity 220 as less processing is required for management functions. The use of ER ABR flow control in the non-real time VPCs 224A may also reduce buffering requirements in the network entity 220 because the volume of traffic arriving at the switch is controlled. The only traffic management function that is required on the network entity 220 is the computation of the explicit rate ABR. This computation is also simplified in the network entity 220 because it is performed on a per-VP basis instead of on a per-VCC basis which would involve many more calculations and require the transmission of many more RM cells to carry the ER information, since there are generally many more VCs than VPs. The use of only one service category for non-real time VPCs also reduces traffic management complexity and requires fewer queues in the VP core network element 220. The use of fewer queues in the network entity 220 also reduces the complexity in computing the explicit rates.

The method of the invention presents certain advantages. First, traffic management and arbitration between the non-real time applications may be concentrated at the edges of the core network of a connection oriented network. This allows for the combination of connections from several non-real time applications having different level of service requirements to be combined onto a common path such as a single VPC. As a result, the core network will generally be required to arbitrate between fewer paths which allows for more efficient and potentially faster switching in the core network. In addition, because the transmission rates at the edge nodes are adjusted by the flow control in the core network, the discard of traffic in the core network is reduced. This enables the core nodes to have less buffer space and less management functions for handling the buffers. Preferably the edge nodes have buffering capabilities in order to accommodate the build up of traffic at the edges of the core network. The method also allows for congestion control to be performed closer to the originator of the connection, wasting less bandwidth in the core from transmitting traffic which will be discarded, and allowing for efficient congestion control techniques such as Early Packet Discard (EPD) or Partial Packet Discard (PPD) to be performed at the edge nodes.

The novel features of the network entity 220 of FIG. 5 may also be applied to certain edge nodes at which VPC traffic is queued, such as the VP termination point 104 of FIG. 2. The implementation of these features in the VP termination point 104 might require certain modifications as will be appreciated by those skilled in this art. However, the VPC termination point 104 could also employ only two queues, one CBR queue for real time VPCs and one ABR queue for non-real time VPCs, and could provide explicit rate information to the non-real time VPCs using a feedback mechanism such as the feedback mechanism 232 of the network entity 220 in FIG. 5.

EXAMPLE

The method of the invention was evaluated using a mathematical simulation model of an ATM network. The evaluation was made according to discrete event simulation techniques using available software tools, as well known to those skilled in this art. The details of the simulation model and the results of the tests are described below. The simulations compared the performance achieved by transporting TCP traffic over a network core using in the UBR VPCs in the network core in the first case, and ABR VPCs in the second. In both the UBR and the ABR simulations, the same traffic management features were provided at the edge of the network core. The evaluation concentrated on the scalability and performance trade-offs between ABR and UBR VPC networks. Scalability refers to the performance response of a particular network to increase traffic volumes. Performance measures include goodput, fairness, and buffer requirements.

The network configuration used in the simulation featured a typical VPC network core having two core switches and five edge switches. Twenty UBR senders (VCCs) were connected to the edge switches, with each edge switch being connected to four of the UBR senders by four separate 150 Mbps communication links. The details of the UBR senders are provided below. At each edge switch, the four UBR VCCs were aggregated onto a non-real time VPC. Only VPCs existed in the network core. The VPCs were ABR or UBR VPCs, depending upon the simulation.

Each of the five edge switches was connected to the first core switch by a 150 Mbps communication link. The first core switch was connected to the second core switch by a 150 Mbps communication link. It is this link which was the network bottleneck for the simulation. The second core switch was connected to twenty receivers by twenty separate 150 Mbps communication links. Thus the path travelled by traffic in the network was from one of the twenty 20 UBR senders to an edge switch over a UBR VCC, from the edge switch to the first core switch over a VPC on a 150 Mbps link, from the first core switch to the second core switch through the 150 Mbps bottleneck link and finally to one of twenty receivers through a 150 Mbps physical link. All link rates were 150 Mbps and the Round Trip Time (RTT). The RTT is the time elapsed between the event of a cell being sent by a source and the event of its receipt being acknowledged to the source. Values used in the simulation for RTT were 25, 50 and 100 msec. In all cases, the delays between the edge switches and the first core switch were the same as the delay between the second core switch and the receivers. The delay between the first core switch and the second core switch was set to three times the delay between the edge switches and the first core switch. The durations of the simulations were 125 seconds (RTT=25 msec), 150 seconds (RTT=50 msec), and 200 seconds (RTT=100 msec). Each simulation had a warm up period of 5 seconds to allow the sources to reach a steady state.

The simulation of ABR VPCs in the core of a large network assessed the performance across a large number of connections sharing common resources in the network core. Rather than focusing on a small subset of connections, this simulation network configuration modelled a large network with high fan-out at the network edge and concentrates on the performance of the VPC core.

All of the UBR senders were identical and are explained further below. The traffic was unidirectional so traffic flowed from the UBR sender to receivers. The network bottleneck was the link between the two core switches. In the simulated configuration, the edge switches contained VC level traffic management functionality such as VS/VD, packet discard, and VP aggregation. The edge switch model is described in more detail below. The traffic source model used for the simulated UBR senders has four layers, the application level on top, followed by the TCP/IP layer, a Segmentation and Reassembly (SAR) function for segmenting IP packets into ATM cells, and finally the transmission line or physical layer at the bottom. For the simulation, the known 4.3 BSD Reno version of TCP with fast retransmission and recovery was used for the TCP layer in the traffic source model. Details of this version of TCP are provided in W. Richard Stevens, "TCP/IP Illustrated: Volume 1—The Protocols", Addison-Wesley, 1994.

The application layer was characterized as an ON-OFF source which transmits files having sizes selected from a uniform distribution, with the minimum file size being 2 MBytes and the maximum being 3 MBytes. The off period between file transfers was selected from a uniform distribution between 0 and 500 msec. In this way, the application modelled a bursty traffic source. After the application selected a file size, it was sent to the TCP/IP layer for transport across the network. TCP was used as part of the traffic source model because it is a popular transport protocol for data communications. TCP includes a flow control mechanism and a retransmission algorithm which together enable error free end-to-end data transmission between TCP users. The TCP window size is adaptive and responds to network congestion and to receiver buffer status.

Transmission by the traffic source model was started from a Slow Start state in which the traffic source model begins with a congestion window (CWND) size of one packet. Upon reception of a packet acknowledgment, the CWND was increased by one packet which gives an exponential growth of the CWND size until it reached a threshold called the Slow Start Threshold (SSThresh). After the CWND size reached the SSThresh, the TCP layer of the traffic source model entered the Congestion Avoidance state where the CWND size increased by one packet only when a full congestion window was acknowledged. This gave a linear increase of the CWND size until it reached the maximum CWND size or a packet loss was detected.

There are two methods by which network congestion (i.e. packet loss) is identified in TCP. In the first method, if a TCP source receives three duplicate acknowledgments (ACK), it deduces that the packet was lost and retransmits the packet. For the TCP version that was modelled in the simulations, the CWND reduces to half and the SSThresh is also set to half the original CWND. For each following duplicate ACK (for the lost packet) the CWND is inflated by one and a new packet is transmitted. This mechanism is called fast retransmit. When the lost packet is finally acknowledged, the CWND is set to the SSThresh and congestion avoidance is performed. This mechanism is called fast recovery. The second method by which a lost packet is identified in the TCP protocol is through retransmit timers. When a retransmit timer expires for a packet that has not been acknowledged, congestion is identified and the CWND is set to 1 while the SSThresh is set to half the original CWND. The time-out value for the retransmit timer is calculated based on the Round Trip Time (RTT). In the second method, the RTT is estimated and the time-out value judiciously determined in order to detect a packet loss as soon as possible, but at the same time avoid false time-outs caused by an excessive delay and not by a packet loss.

For the simulation, the maximum window size was scaled, as described in V. Jacobson et al., "TCP Extensions for High Performance," RFC 1323, May 1992, to take into account the link rate and the propagation delay of the links. Accordingly, the window size was set to the bandwidth delay product (BDP):

$$TCP \text{ Window Size}=RIT \times \text{Link Rate}=BDP \quad (1)$$

where the window size is expressed in bytes.

The TCP segment size was 1536 bytes. The TCP traffic source model included a small random delay which eliminates the phasing effects reported in S. Floyd and V. Jacobson, "On Traffic Phase Effects in Packet-Switched Gateways", Internetworking: Research and Experience, V.3 N.3, September 1992, 115–156. The TCP traffic source model used in the simulations did not implement selective acknowledgment and processes acknowledgments without delay.

The edge switch model used in the simulation will now be described in detail. As mentioned earlier, the edge switch model implemented certain traffic management features. The edge switch model supported per-VC queuing and the buffer capacity was limited to 10 k cells for all simulations. When the buffer occupancy grew to above 90% capacity (9000 cells), per-VC thresholds were calculated to determine the fair share for each connection. Only connections using more than their fair share (equal share of the buffer) when the edge switch was congested experienced packet discard. This congestion control mechanism ensures fairness among connections at the network edge.

The four UBR VCCs provided at each simulated edge switch were aggregated onto a non-real time VPC provided on the 150 Mbps link. The UBR VCCs were scheduled onto the VPC using Round Robin arbitration. Therefore, the simulated VPC contained a mix of cells from all active connections. The edge switch also supported the explicit rate (ER) ABR model and had a VS/VD. During the ABR simulation, the UBR VCCs were aggregated onto an ABR VPC which was shaped according to the ER received in the backward RM cells. The details of the explicit rate algorithm used in the ABR simulation and a complete listing of ABR parameters and values are provided below. During the UBR simulation, the UBR VCCs were aggregated onto a UBR VPC shaped at a PCR, which is set to the link rate, i.e., 150 Mbps.

The core switch model used in the simulation will now be described in detail. The core switches were modelled as simple FIFO queues with a given buffer size. During the ABR simulation, the core switches performed Explicit Rate ABR according to the Uniform Tracking (UT) algorithm as described in C. Fulton, S. Q. Li and C. S. Lim, "An ABR Feedback Control Scheme with Tracking", Proceedings of IEEE Infocom'97; Kobe, Japan; April 1997, at pp. 805 to 814. Other explicit rate ABR algorithms may instead have been used in the simulation. The UT algorithm was selected to reduce the complexity of the simulation since it is a simple algorithm with few tunable parameters. The UT algorithm performs rate monitoring to adjust the ER value in the backward RM cells. The ABR sources at the edge switches shaped the ABR VPCs according to the ER value. The UT explicit rate algorithm is described more fully below. Because per-VC frame delineation was not visible by a simulated core switch, only cell discard was supported.

As mentioned earlier, the Uniform Tracking (UT) algorithm was used to provide a rate-based control scheme for the ABR simulation. One of the main features of UT is its simplicity. UT achieves max-min fairness without requiring explicit knowledge of the number of active sources ($N_{tot}$), the number of active constrained sources ($N_{con}$), or the capacity achievable by the constrained sources ($C_{con}$). A constrained source is defined as a source unable to achieve fair share due to either physical (e.g., PCR) or network (e.g., bottleneck) limitation.

The operation of UT can be briefly described as follows. During each control interval, denoted by $t_C$, UT switches compute an effective Fair Share, $FS_{eff}$. The Fair Share is written into the ER field of a backward RM cell if it is smaller than the presently stored value. The $FS_{eff}$ is computed by:

$$FS_{eff} = \frac{\rho_T C - \tilde{r}_B(n)}{N_{eff}} \quad (2)$$

where:
$\rho_T$=target link utilization;
C=link capacity;
$N_{eff}$=effective number of sources; and
$\tilde{r}_B(n)$=lowpass-filtered background traffic rate at time interval n.

The parameter $\rho_T$ is configurable with values between 0 and 1. The effective number of sources $N_{eff}$ is tracked by:

$$N_{eff} = \max\left\{\frac{r_A(n)}{F\tilde{S}_{eff}}, 1\right\} \quad (3)$$

where:
$r_A(n)$=total measured ABR rate at time interval n; and
$F\tilde{S}_{eff}$=moving average of previously assigned $FS_{eff}$.

From the previous discussion, it is clear that the control interval t, is an important parameter for UT, in the sense that it must be chosen sufficiently large to obtain accurate rate estimates (a single cell should not be interpreted as a high increase in the rate of transmission) and to allow practical implementation. However, selection of too long an interval may lead to sluggish results. The authors in Fulton et al. have proposed to select the control interval from:

$$t_c \approx \max\left\{\frac{1}{0.005\rho_T C}, 10 \text{ ms}\right\} \quad (4)$$

where the link capacity C has units of cells/ms.

The ABR parameter values, including UT parameters, are provided in Table 1 below.

TABLE 1

ABR Parameters

| Symbol | Definition | Value |
|---|---|---|
| $t_C$ | Control Interval | 1 ms |
| MCR | Minimum Cell Rate | 1 Mbps |
| ICR | Initial Cell Rate | 7.5 Mbps |
| PCR | Peak Cell Rate | Link Rate[1] |
| PT | Target Link Utilization | $0.90^2$ |
| RDF | Rate Decrease Factor | $1/32768^3$ |
| RIF | Rate Increase Factor | $1^3$ |
| Nrm | Number of data cells between forward RM cells | $32^1$ |
| Mrm | Controls bandwidth allocation between forward RM cells, backward RM cells, and data cells | $2^1$ |
| TBE | Transient Buffer Exposure | $16e6^1$ |
| CDF | Cutoff Decrease Factor | $1/16^1$ |
| Trm | Upper bound on the time between forward RM cells | $0.1s^1$ |
| ADTF | ACR Decrease Time Factor | $0.5s^1$ |

[1]Default values from the Traffic Management Specification.
[2]Configurable.
[3]Default values from the Addendum to Traffic Management Specification.

The performance measures of (i) buffer occupancy, (ii) fairness to users, and (iii) goodput were used to evaluate the simulation. These are described in greater detail below.

The first performance measure used in the simulation was buffer occupancy. In the case of a rate-based control mechanism, the buffer occupancy together with the link utilization are essential metrics to evaluate. If at any point in time, the buffer occupancy is very high, this means that the control mechanism is typically accepting more cells into the network than it should. However, if the link utilization is low when sources are active, this means that the control mechanism is overreacting.

The second performance measure used in the simulations was fairness among connections. Generally, it is one of the performance objectives of network designers to provide fairness to all connections of a network. Fairness ensures that no connections are arbitrarily discriminated against and no set of connections are arbitrarily favoured. A fairness index as defined in the Traffic Management Specification Version 4.0 can be used to evaluate the fairness of the allocation of available bandwidth among the users of a network resource such as a connection. The fairness index may be expressed as follows:

$$\text{Fairness Index} = \frac{\left(\sum_i x_i\right)^2}{n \sum_i x_i^2} \quad (5)$$

where:
n is the number of connections (or sources) sharing the network resources; and
$x_i$ is the ratio of the actual throughput of connection i, to the optimal throughput.

The optimal throughput is the fair share of the available bandwidth for the considered connection. For the network configuration used in the simulations, all the contending connections were statistically equivalent and the optimal throughput was the same for all the connections.

The third performance measure used in the simulations was goodput. Goodput may be defined as the ratio of the achieved throughput to the maximum achievable throughput. Throughput is defined as the rate of good data received by the TCP receivers. Good data refers to the amount of successfully received packets at the TCP receiver. Retransmissions triggered by the TCP stack or duplicate packets received at the receiver are not counted as good data. The maximum achievable throughput is limited by the bottleneck in the network or at the source. Usually, goodput is expressed as a percentage of the bottleneck link and reflects the efficiency in using the link. The goodput is then given by:

$$Goodput = \frac{\sum_i GoodData_i}{N \cdot T \cdot LineRate \cdot \left[\frac{Pkt\ Size}{53 \cdot \frac{Pkt\ Size}{48}}\right]} \quad (6)$$

where:
N is the number of bottleneck links;
Good Data is the total amount in bits of data corresponding to successfully transmitted packets;
T is the measurement period (simulation time in this case);
Pkt Size is the size of the TCP packet in bytes; and
Line Rate is the maximum transmission rate of the bottleneck link between the two switches.

The ER algorithm implemented in each core switch for the ABR simulation had a configurable Target Rate parameter. For the simulations, the Target Rate was set to utilize 90% of the output rate of the core switch. In the evaluation, the ABR goodput was calculated relative to the target utilization. For both the ABR and the UBR simulations, the TCP window size was set to the Bandwidth Delay Product (BDP), as shown in Table 2. The core switch buffer sizes were rounded up to multiples of 10 kcell values.

TABLE 2

Bandwidth Delay Products

| RTT | TCP Window Size (bytes) | Core Switch Buffering |
|---|---|---|
| 25 msec | 465625 | 10 kcells |
| 50 msec | 931250 | 20 kcells |
| 100 msec | 1862500 | 40 kcells |

Having described the network configuration used in the simulations and the performance measures used to evaluate the performance of the ABR and UBR VPCs, the results of the simulations will now be discussed.

One approach to compare the scalability of simulated UBR and ABR VPCs is to compare the goodput performance as the delay increases, for a given buffer size. Thus, in the first set of simulations, the core node buffer size was limited to 10 kcells for both the UBR VPC and the ABR VPC. It was found that levels of goodput were higher for all RTTs when ABR VPCs were used in the simulated core network. In the ABR simulation, the core nodes experienced low average cell occupancy and congestion was successfully pushed to the edge nodes where intelligent packet discard is supported. By distributing congestion across the edge nodes, the simulated ABR VPC network maintained its performance.

The simulated UBR VPC performance was significantly affected by increasing delay. In the UBR VPC case, the core node buffer was the single point of cell loss with 20 connections bottle necked and regularly experienced random cell loss. In the ABR VPC case, congestion occurred at the edge node where only four connections were bottle-necked and where packet discard was performed. It is well known that TCP requires packet discard to maximize performance. Once a single cell was discarded from a packet, the packet was discarded at the TCP receiver. Transporting partial packets to a receiver is wasteful of bandwidth.

A comparison of the goodput performance of simulated ABR and UBR VPCs is graphically represented in FIG. 6. It can be seen that a goodput of approximately 87% was maintained in the simulation for all values of RTT for the ABR VPCs, while goodput using the UBR VPCs declined from approximately 78% at RTT=25 msec to 67% and 68% for RTT=50 msec and RTT=100 msec, respectively.

Random cell loss caused many packets from many connections to be discarded and increased the number of TCP time-outs. As more connections experience time-outs at the same time, bandwidth becomes under utilized. The simulation results showed that up to 4 times more time-outs are experienced with UBR VPCs than ABR VPCs. The simulated core node buffer was not large enough to keep the output link utilized while the TCP connections recovered from congestion. In the UBR VPC case, the simulated core node output link utilization dropped from 87% (RTT=25 msec) to approximately 75% (RTTs of 50 and 100 msec). The simulation results suggest that an ABR VPC network core scales better and maintains higher performance with increasing network delays than does a UBR VPC network operating under identical loads.

The sensitivity of UBR VPC goodput performance to different simulated core switch buffer sizes is graphically represented in FIG. 7. Note that for the RTT=25 msec UBR VPC simulation, the BDP is approximately equal to 10 kcells. As the buffer size increased, more sources were able to recover from congestion and the total number of TCP time-outs decreased. However, FIG. 7 shows that TCP goodput performance only improved marginally when the buffer size in the simulated core node was more than approximately 3 times the BDP. It will be appreciated from this simulation that in order for the UBR VPCs to achieve a comparable goodput performance to that of the ABR VPCs, the required buffering in the UBR case must be approximately 3 or 4 times the BDP (per output port).

FIG. 8 shows a graphical comparison of the core node buffer size required in order for UBR VPCs to match the goodput performance of ABR. Again, this shows that for purposes of the simulation, ABR scaled much better than UBR as the RTT increased. As the delay increased in the simulation network, UBR required larger and larger buffers to match the performance of ABR. However, ABR was able to dynamically control the core node buffer occupancy and successfully moved congestion to the edge nodes as simulated. The intelligent packet discard at the simulated edge nodes ensured fairness, and ABR was able to maximize goodput performance.

The fairness achieved in the ABR and UBR simulations was also measured. Fairness can be measured at both the VPC and VCC levels in a hierarchical fashion. The following Tables 3, 4 and 5 show the simulated fairness performance of i) ABR, ii) UBR with 10 kcell core node buffers, and iii) UBR with core node buffer size large enough to have goodput performance equal to ABR.

Fairness for VPC 1, for example, measured the fairness among all connections within an individual VPC. The overall VPC fairness measures the fairness among all VPCs network-wide. The VCC overall fairness measures the fairness among all VCCs and may differ from the overall VPC fairness. The tables show that for the purposes of the simulation, the use of ABR VPCs and the concentration of traffic management and congestion control at the edge switches ensured fairness at all levels. Because UBR experiences random cell loss, it is expected that it is somewhat fair. However in all simulated cases, ABR fairness is equal to or better than that of UBR at the VPC and VCC levels.

It should be noted that the fairness is not a linear function. For example, a larger performance increase was generally required in the simulation to increase fairness from 97 to 98 percent, than to increase from 50–60%.

TABLE 3

Simulated Fairness Performance for RTT = 25 msec

| | Core Node Buffer Size (cells) | Fairness (%) | | | | | | |
|---|---|---|---|---|---|---|---|---|
| | | VPC 1 | VPC 2 | VPC 3 | VPC 4 | VPC 5 | VPC Overall | VCC Overall |
| UBR | 10 k | 99 | 98 | 100 | 99 | 100 | 100 | 99 |
| UBR | 40 k | 99 | 99 | 99 | 99 | 99 | 100 | 99 |
| ABR | 10 k | 100 | 100 | 100 | 100 | 100 | 100 | 100 |

TABLE 4

Simulated Fairness Performance for RTT = 50 msec

| | Core Switch Node Size (cells) | Fairness (%) | | | | | | |
|---|---|---|---|---|---|---|---|---|
| | | VPC 1 | VPC 2 | VPC 3 | VPC 4 | VPC 5 | VPC Overall | VCC Overall |
| UBR | 10 k | 100 | 100 | 99 | 99 | 100 | 99 | 99 |
| UBR | 60 k | 99 | 97 | 100 | 95 | 96 | 100 | 97 |
| ABR | 10 k | 100 | 100 | 100 | 100 | 100 | 100 | 100 |

TABLE 5

Simulated Fairness Performance for RTT = 100 msec

| Core Node | | Fairness (%) | | | | | |
|---|---|---|---|---|---|---|---|
| | Buffer Size (cells) | VPC 1 | VPC 2 | VPC 3 | VPC 4 | VPC 5 | VPC Overall | VCC Overall |
| UBR | 10 k | 99 | 99 | 98 | 100 | 100 | 100 | 99 |
| UBR | 80 k | 99 | 99 | 99 | 96 | 100 | 100 | 98 |
| ABR | 10 k | 100 | 100 | 100 | 100 | 100 | 100 | 100 |

The foregoing simulation results would indicate that the use of ABR VPCs in the simulated network core is a more scalable and efficient solution than the use of UBR VPCs therein. The ABR VPC solution, as simulated, is able to minimize core buffer requirements while maintaining high goodput performance over varying delays. Large buffers in the simulated core nodes will add queuing delay to the traffic during congestion. By pushing congestion to the network edge, the simulation suggests that ABR is able to utilize intelligent packet discard such as EPD and PPD to ensure fairness at the VCC level. Furthermore, the simulation would indicate that pushing congestion to the edges generally allows for more efficient use of the available buffers at the edge switches of the simulated network. Finally, the simulated ER-ABR core facilitates the fair allocation of bandwidths among the VPCs of the simulated network.

It will be understood by those skilled in the art that this invention could also be used in other connection oriented communications networks which have flow control capability for non-real time traffic. Furthermore, the invention may be implemented in network entities other than the network elements as described above. Likewise, the principles of the present invention can be adapted to network cores which are only VC capable and wherein aggregation points and termination points at the edge of the cores terminate a single VC. Those skilled in the art will also appreciate generally that the invention has been described herein by way of example only, and that various modifications of detail may be made to the invention, all of which come within its spirit and scope.

The invention claimed is:

1. A method for transmitting non-real time and real time traffic in a connection oriented communications network wherein the traffic is carried between end users over virtual channel connections, and wherein groups of virtual channel connections can be aggregated into virtual path connections, comprising:
    (a) provisioning a network core which includes a plurality of core nodes in communication over virtual path connections, wherein separate virtual path connections are provided for real time and non-real time traffic;
    (b) provisioning an edge network which includes a plurality of edge nodes in communication with end users over said virtual channel connections, said edge nodes serving as aggregation points and segregation points for said virtual path connections in the network core;
    (c) at the aggregation points, aggregating onto the virtual path connections and into an aggregate traffic stream the non-real time traffic received from said plurality of virtual channel connections, the non-real time traffic being transmitted on the virtual path connections as the aggregate traffic stream without regard to which of the plurality of virtual channel connections the non-real time traffic is associated and without regard to the class of transmission service of such plurality of virtual channel connections;
    (d) at the aggregation points, segregating the aggregate traffic stream so transmitted on the virtual path connections according to which of the plurality of virtual channel connections the non-real time traffic is associated; and
wherein at least two of the said virtual channel connections aggregated into said virtual path connection in the network core do not have a same class of transmission service, wherein flow control is applied to said virtual path connections in said network core between the aggregate points to thereby regulate the rate of transmission of the non-real time traffic along the virtual path connections, the flow control terminating at said aggregation points and said segregation points, wherein the virtual path connections are provisioned with a guaranteed transmission bandwidth and dynamic bandwidth allocation such that when additional bandwidth becomes available said flow control permits said non-real time traffic to be transmitted on the virtual path connection at an increased rate, wherein traffic management, including the assignment of bandwidth in said virtual path connections, for said virtual channel connections is performed at said aggregation points, and wherein traffic management in said network core is performed only on said virtual path connections without differentiating among virtual channel connections carried on the same virtual path connection even if said virtual channel connections carried on the same virtual path connection have different classes of transmission service.

2. The method of claim 1, wherein the connection oriented communications network is an ATM network, the non-real time traffic is ATM traffic and plurality of classes of transmission service are ATM service categories.

3. The method of claim 2, wherein the flow control applied between the aggregation and segregation points includes a flow control algorithm whereby the rate of transmission of the non-real tine traffic on the path is regulated by providing feedback information to the aggregation point concerning congestion at a contention point on the virtual path connection.

4. The method of claim 2, wherein the flow control applied between the aggregation point and the segregation point includes a flow control algorithm whereby the rate of transmission of the non-real time traffic on the virtual path path connection is regulated by providing an explicit rate of transmission to the aggreagation source.

5. The method of claim 4, wherein the non-real time Virtual Path Connection operates according to an Available Bit Rate (ABR) service category.

6. The method of claim 5, wherein the flow control applied between the aggregation and segregation points is provided by a plurality of ABR flow control segments between the aggregation and segregation points.

7. The method of claim 6, wherein the aggregation point further comprises a set of queues each corresponding to one of the plurality of classes of transmission service that are associated with the plurality of connections, and wherein the non-real time traffic received over said each of the plurality of virtual channel connections is queued in the queue associated with the class of transmission service associated with each virtual channel connection before aggregating the non-real time traffic onto the path.

8. The method of claim 7, wherein the traffic management includes scheduling of the plurality of virtual channel connections onto the virtual path connection.

9. The method of claim 6, wherein the aggregation point further comprises a queue for said each of the plurality of virtual channel connections and wherein the non-real time traffic received over said each of the plurality of virtual connections is queued in the queue associated with the connection before aggregating the non-real time traffic onto the virtual path connection.

10. The method of claim 1, wherein at least one of the plurality of virtual channel connections aggregated onto the virtual path connection is provisioned with a guaranteed bandwidth and the guaranteed transmission bandwidth of the path is obtained by summing the guaranteed transmission bandwidths for the at least one of the plurality of connections aggregated onto the path.

11. The method of claim 10, wherein the guaranteed transmission bandwidth for the at least one of the plurality of virtual channel connections is a guaranteed minimum transmission bandwidth and the guaranteed transmission bandwidth for the path is a guaranteed minimum transmission bandwidth.

12. The method of claim 11, wherein transmission bandwidth in the network core Is allocated between real time traffic and non-real time traffic, and wherein a share of the transmission bandwidth in addition to the guaranteed minimum transmission bandwidth for the virtual path connection is made available to the virtual path connection if the transmission bandwidth allocated to the real time traffic is unused.

13. The method of claim 11, wherein a share of the transmission bandwidth in addition to the guaranteed minimum transmission bandwidth for one of the plurality of virtual channel connections is made available to the one of the plurality of virtual channel connections if the transmission bandwidth allocated to another of the plurality of virtual channel connections is unused.

14. A communications network comprising a network core including a plurality of core nodes in communication over virtual path connections and an edge network including a plurality of edge nodes in communication with end users over virtual channel connections, wherein traffic entering the network core is aggregated from a plurality of virtual channel connections onto aggregate traffic streams comprising virtual path connections within the network core and wherein traffic exiting the network core is segregated from said aggregate traffic streams onto virtual channel connections outside the network core, the traffic comprising real time traffic and non-real time traffic, the non-real time traffic which enters the network core and is aggregated onto an aggregate traffic stream is received from virtual channel connections that each have one of a plurality of classes of transmission service such that at least two connections have classes of transmission service different from each other, the real time traffic and the non-real time traffic each being aggregated into respective real time aggregate traffic streams and non-real time aggregate traffic streams comprising separate virtual path connections, each of the non-real time aggregate traffic streams having one of the plurality of classes of transmission service, each of the non-real time aggregate traffic streams is provisioned with dynamic bandwidth allocation and a guaranteed transmission bandwidth, the real time traffic in each real time path aggregate traffic stream being transmitted from a corresponding aggregation point to a corresponding segregation point according to a first class of path transmission service and the non-real time traffic on each non-real time path aggregate traffic stream being transmitted from a corresponding aggregation point to a corresponding aggregation point according to a second class of path transmission service, and wherein flow control is applied to each non-real time aggregate traffic stream between the aggregation point and the segregation corresponding to each non-real time aggregate traffic stream to thereby regulate the rate of transmission of the non-real time traffic associated with each said non-real time aggregate traffic stream and permit the transmission rate to be increased as additional bandwidth becomes available, the flow control terminating at said aggregation point and at said segregation point corresponding to each non-real time aggregate traffic stream, and wherein traffic management, including assignment of bandwidth in said virtual path connections, for said virtual channel connections is performed at said aggregation points, and wherein traffic management in said network core is performed only on said virtual path connections without differentiating among virtual channel connections carried on the same virtual path connection even if said virtual channel connections carried on the same virtual path connection have different classes of service.

15. A method of transmitting real time and non-real time traffic across a connection-oriented communication network wherein the traffic is carried between end users over virtual channel connections, and wherein groups of virtual channel connections can be aggregated into virtual path connections, comprising:
   a) provisioning a network core which includes a plurality of core nodes in communication over virtual path connections, wherein separate virtual path connections are provided for real time and non-real time traffic;
   b) provisioning an edge network which includes a plurality of edge nodes in communication with end users over said virtual channel connections, said edge nodes serving as aggregation points and segregation points for said virtual path connections in the network core;
   c) establishing a maximum usable bandwidth and a minimum guaranteed bandwidth for said virtual path connections which are provisioned with dynamic bandwidth allocation, and flow control for said virtual path connections wherein as additional bandwidth becomes available said flow control permits said non-real time traffic to be transmitted on said virtual path connections at an increased rate;
   d) at said aggregation points, dynamically mapping all non-real time traffic flows in said virtual channel connections for said segregation points to said virtual path connections based on a service category of each virtual channel connection and a minimum guaranteed transmission rate for said virtual channel connections;
   e) aggregating all said non-real time traffic flows into an aggregated traffic flow in said virtual path connections by distributing the minimum guaranteed bandwidth of said virtual path connection among said non-real time traffic flows such that said each non-real time traffic flow receives a share of said minimum guaranteed bandwidth;

f) dividing any remaining bandwidth at said aggregation points following said distribution of the minimum guaranteed bandwidth available on said virtual path connection among said non-real time traffic flows according to a fairness policy; and g) routing said aggregated traffic flow along said virtual path connections toward said segregation points, without differentiating among said non-real time traffic flows at any core node in the connection.

16. The method of transmitting non-real time traffic across a connection-oriented communication network as claimed in claim 15, wherein one service category of one traffic flow of said non-real time traffic flows is selected from CBR/rt-VBR, nrt-VBR, UBR and ABR.

17. The method of transmitting non-real time traffic across a connection-oriented communication network as claimed in claim 16, herein the ABR service category supports:

a minimum cell rate (MCR) guarantee representing a static bandwidth required for the network to achieve a quality of service guarantee for constituent traffic flows; dynamic bandwidth allocation allowing access to unused bandwidth in the network for ABR and, UBR VCCs: and network fairness through explicit rate (ER) bandwidth allocation.

18. The method of transmitting non-real time traffic across a connection-oriented communication network as claimed in claim 15, wherein the fairness policy performs flow control utilizing feedback information from the destination node for dividing said any remaining bandwidth.

19. The method of transmitting non-real time traffic across a connection-oriented communication network as claimed in claim 18, wherein flow control is explicit rate (ER) flow control.

20. The method of transmitting non-real time traffic across a connection-oriented communication network as claimed in claim 19, wherein division of said any remaining bandwidth is dynamically adjusted based on feedback from specific core nodes.

21. The method of transmitting non-real time traffic across a connection-oriented communication network as claimed in claim 20, wherein the connection is segmented due to flow control fragmentation.

* * * * *